United States Patent [19]

Sasaki et al.

[11] Patent Number: 5,480,231
[45] Date of Patent: Jan. 2, 1996

[54] SPHERICAL SLIDING BEARING

[75] Inventors: Takayoshi Sasaki; Kotaro Kashiyama, both of Nagoya, Japan

[73] Assignee: Daido Metal Company Ltd., Nagoya, Japan

[21] Appl. No.: 337,487

[22] Filed: Nov. 8, 1994

[30] Foreign Application Priority Data

Dec. 28, 1993 [JP] Japan .................................. 5-336529

[51] Int. Cl.$^6$ ............................ F16C 23/04; F16C 33/28
[52] U.S. Cl. ........................................ 384/206; 384/298
[58] Field of Search ................................. 384/192, 206, 384/208, 213, 298–300

[56] References Cited

U.S. PATENT DOCUMENTS

| | | | |
|---|---|---|---|
| 2,711,352 | 6/1955 | Hasko et al. | 384/213 X |
| 3,528,710 | 9/1970 | Roesner et al. | 384/208 |
| 4,111,499 | 9/1978 | McCloskey | 384/206 |
| 5,242,228 | 9/1993 | Hattori | 384/206 X |

FOREIGN PATENT DOCUMENTS 5186790  7/1993  Japan .

Primary Examiner—Thomas R. Hannon
Attorney, Agent, or Firm—Browdy and Neimark

[57] ABSTRACT

A spherical sliding bearing comprising a hollow inner rotating metallic shaft member having a spherical convex surface on its periphery, an outer load-carrying member having a spherical concave surface generally in conformity with the convex surface, the inner rotating shaft member being supported by the outer load-carrying member so as to freely rotate and oscillate under the sliding-contact relationship between the convex and concave surfaces, and a pressure-bearing seat being interposed between the convex and concave surfaces, which contains a fluorocarbon resin, a modifier dispersed in the fluorocarbon resin and a metallic member which is entirely embedded in the fluorocarbon resin and assures the strength of the pressure-bearing seat.

13 Claims, 1 Drawing Sheet

SPHERICAL SLIDING BEARING

BACKGROUND OF THE INVENTION

The present invention relates to a spherical sliding bearing with no need for lubricating oil supply and providing a low friction which is mainly used for connection between the constituent parts on the under side of a torque rod or a suspension rod such as that used in transportation machines including automobiles.

Sliding components conventionally used in automobiles and the like, which connect constituent parts with one another, include a cylindrical sliding component made of polyacetal, polyamide, or the like supported by a metallic cylinder or a combination of a metallic cylinder whose peripheral surface is covered with an elastic material such as vulcanized rubber and another metallic cylinder being fitted on the outer vulcanized rubber. It exhibits a high starting torque and requires lubricating oil such as grease.

SUMMARY OF THE INVENTION

An object of the invention is to eliminate damages to a bearing caused when a shaft oscillates or rotates, such as in the sliding of the conventionally used sliding component at a high starting torque, wear, abnormal wear due to lack of lubricating oil, looseness or creaking caused by creep and the like, cracking or fatigue in an elastic material such as rubber, or damages resulted from lack of proper oil supply, and to solve the problem of an increase in the friction coefficient attributed to rust which occurs during a long-term suspension of operation.

In the light of the above object, according to the invention, there is provided a spherical sliding bearing comprising a hollow inner rotating metallic shaft member having a spherical convex surface on its periphery; a hollow outer load-carrying member having a spherical concave surface generally in conformity with the above-mentioned spherical convex surface, the hollow inner rotating shaft member being supported by the hollow outer load-carrying member so as to freely rotate and oscillate under the fitting relationship between the convex and concave surfaces; and a pressure-bearing seat interposed between the convex and concave surfaces, which comprises fluorocarbon resin, a modifier dispersed in the fluorocarbon resin, and a reinforcement metallic member which is not exposed to the sliding-contact surface of the pressure-bearing seat. A rotating shaft is inserted and fixed on the inside of the hollow inner rotating shaft member and supported by the spherical sliding bearing so that it can oscillate and rotate.

A metal net or an expanded metal (prepared by providing a number of regularly arranged short slits to a metal plate and expanding it by adding a tensile force), as is described in JP-A-5-186790, is suitably used as the reinforcement metallic member of the pressure-bearing seat. The metal net or expanded metal is entirely embedded in the fluorocarbon resin. In other words, the resin completely fills in all of the meshes or openings of the metal net or expanded metal and covers the entire surface of the metal net or expanded metal. A modifier is added to the fluorocarbon resin, which operates also as a reinforcement material.

The fluorocarbon resin is preferably consisting of tetrafluoroethylene as a basic component and at least one material selected from the group consisting of tetrafluoroethylene-perfluoroalkyl-vinyl-ether copolymer resin, tetrafluoroethylene-hexafluoropropylene copolymer resin, and fluoroethylene-propyl-ether resin.

The modifier is preferably at least one selected from the group consisting of oxybenzoyl polyester, polyphenylene sulfide, a thermosetting resin, a metal lubricant, metal oxide, metal sulfide, metal fluoride, a carbonic solid lubricant, and ceramics, which is used for improving the sliding properties of the pressure-bearing seat such as wear resistance or the friction coefficient. The fluorocarbon resin containing the modifier exhibits an excellent sliding performance in sliding contact with the pressure-bearing seat and the spherical convex surface of the hollow inner rotating shaft member.

The pressure-bearing seat can be produced by press forming of a blank plate. The plate can be easily formed to the spherical shape on account of its excellent drawing workability. Since the pressure-bearing seat has a structure composed of the fluorocarbon resin strengthened by the reinforcement metallic member and the modifier (filler), it has a high rigidity and is suitably fixed to the outer load-carrying member along its concave surface while maintaining the shape provided by the press forming. The fixing mounting of the pressure-bearing seat can be suitably carried out with circumferential ring shape projections of the outer load-carrying member which are located apart from each other along the axial direction thereof and respectively project at the two end edges of the concave surface.

The hollow inner rotating metallic shaft member having a spherical convex surface is suitably formed by forging. The spherical convex surface, which is in sliding contact with the pressure-bearing seat, is preferably subjected to electroless nickel-phosphorus plating to provide the surface a smoothness (roughness) of 0.8 S or less and a surface hardness of from Hv 900 to 1100. The plating treatment offers low friction contact with the pressure-bearing seat so that wear of both of the sliding contact members can be reduced and corrosion of the hollow inner rotating shaft member can be effectively prevented.

In the case where the outer load-carrying member has a structure in which the spherical concave surface is divided into two sections in the axial direction, the concave surface can be fitted on the spherical convex surface of the hollow inner rotating shaft member. In such assembled state, gaps between each constituent component of the spherical bearing should be removed to ensure the contact of the entire surface of the pressure-bearing seat and both of the concave and convex spherical surfaces. In the case where the outer load-carrying member is made of metal, the spherical convex surface of the hollow inner rotating shaft member is fitted in the primary section of the divided outer load-carrying member so as to engage with the spherical concave surface and subsequently the remaining section is assembled to the primary section, thereafter the two divided sections are connected to each other by caulking to thereby enable the effective contact of the entire surfaces of the pressure-bearing seat and the concave and the convex spherical surfaces. The entire contact of the sliding contact members ensures a low friction between the members, realizes low starting torque of the rotating shaft, and reduces wear of each sliding contact member.

As described above, according to the spherical sliding bearing of the invention, since it comprises the combination of the pressure-bearing seat which can be easily formed into a spherical form on account of its excellent workability in drawing and be used in a low friction under a high surface pressure without lubrication, and the inner rotating shaft member which is provided with an electroless nickel-phosphorus plating layer to improve its rust-preventive ability, there can be attained a sliding operation at low starting torque, low friction, wear resistance, good sliding property

DESCRIPTION OF THE PREFERRED EMBODIMENTS

Figure 1:
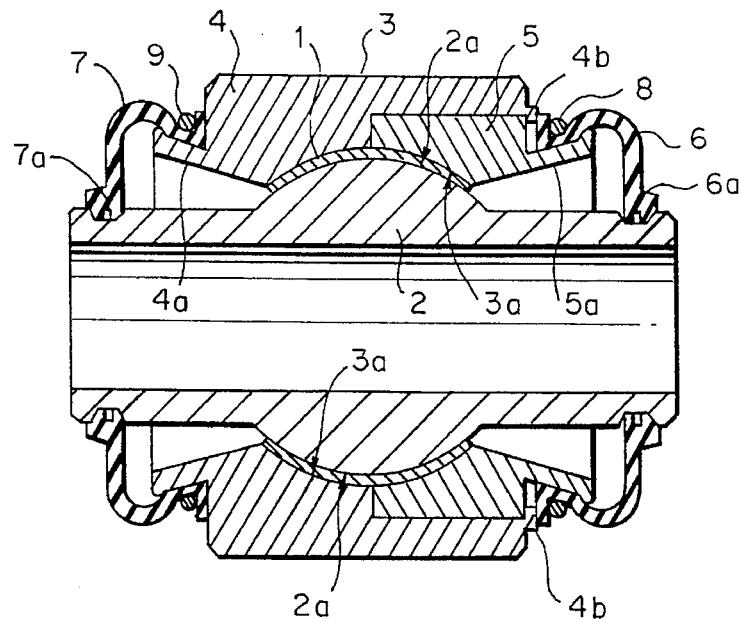
FIG. 1 shows a longitudinal sectional drawing of the spherical sliding bearing.

The spherical sliding bearing shown in the drawings comprises an inner rotating shaft member 2 into which a shaft (not shown) to be supported is inserted, an outer load-carrying member 3, and a spherical pressure-bearing seat 1, as main components. The inner rotating shaft member 2 is a hollow body having a spherical convex surface 2a outside of the central part thereof in the longitudinal direction or axial direction. The outer load-carrying member 3 also is a hollow body having a spherical concave surface 3a inside of the hollow in the axial direction. The pressure-bearing seat 1 is fitted on the concave surface 3a under pressure and the spherical convex surface 2a of the inner rotating shaft member 2 is oscillatably and rotatably fitted in it having a spherical inner surface.

The outer load-carrying member 3 is composed of two cylindrical sections of a primary half 4 and a secondary half 5. The primary half 4 and the secondary half 5 have thin walls 4a and 5a at the both ends to form circumferential recesses, respectively. The basic body of the secondary half 5 is fitted in the primary half 4 at the opposite side of the thin wall 4a and is tightly secured with a bent projection 4b having a ring shape by caulking.

Further, rubber boots 6 and 7 are attached in circumferential grooves formed at both ends of the inner rotating shaft member 2 and the thin end walls 4a and 5a of the outer load-carrying member 3. The boots will be illustrated in detail herein below.

Figure 2:
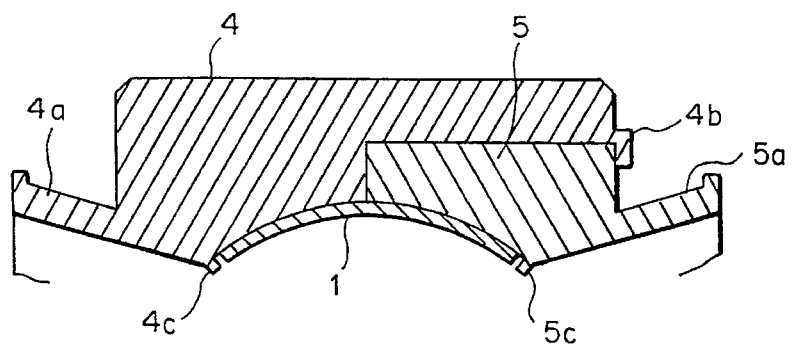
FIG. 2 shows a longitudinal sectional drawing of essential parts of the outer load-carrying member and the pressure-bearing seat.
Figure 3:
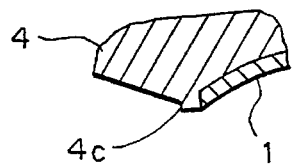
FIG. 3 shows a manner of retaining the pressure-bearing seat.

The pressure-bearing seat 1 comprises a metal net or expanded metal as a basic body and a lubricating component consisting of a fluorocarbon resin, and at least one reinforcement material selected from a metal lubricant, metal oxide, a metal oxide complex, metal sulfide, metal fluoride, a carbonic solid lubricant, fabric material, ceramics, a thermosetting resin, oxybenzoyl polyester and polyphenylene sulfide. The basic body is coated with the lubricating material by impregnation to cover not only the entire surface but to fill the meshes thereof. The pressure-bearing seat 1 is formed to provide a spherical shape in conformity with the spherical convex surface 2a of the inner rotating shaft member 2 and fixed on the spherical concave surface 3a of the outer load-carrying member 3 by circumferential ring shape projections 4c and 5c (FIG. 2) to prevent it to leave from the member 3 when the inner rotating shaft member 2 is in motion (oscillate or rotation) so that bearing properties of low friction and resistance to high surface pressure are kept. The rubber boots 6 and 7 are attached to the thin end walls 4a and 5a so as to prevent foreign contaminants, such as water or dust, from entering between the inner rotating shaft member 2 and the pressure-bearing seat 1. The boots 6 and 7 are preferably made of chloroprene rubber which is excellent in weather resistance. In order to further improve dustproof property of the boots, circumferential grooves 6a and 7a are formed along the inner peripheral and surfaces of the boots, respectively, within which grease is provided. The boots 6 and 7 are also fixed on the thin walls 4a and 5a by retaining spring wires 8 and 9. Since the thin walls 4a and 5a are inclined expanding to the outside in the radial direction, the boots 6 and 7 are well sustained.

The outer load-carrying member 3 can be readily assembled to the inner rotating shaft member 2 since the former consists of two divided section. The secondary half 5 is connected to the primary half 4 by means of caulking with utilization of the bent projection 4b to prevent the secondary half to axially move. The convex surface of the inner rotating shaft member 2 is supported by the concave surface of the outer load-carrying member 3 so as to rotate and oscillate wherein its complex motion is ensured under low friction and without lubricating oil with respect to the pressure-bearing seat 1. Using the spherical sliding bearing of the invention, the inner rotating shaft member 2 can oscillate within an angle range of ±10° with respect to the axis.

In the above embodiment, occurrence of rust on the inner rotating shaft member 2 will adversely affect the bearing operation. In accordance with JIS-Z2371, the salt spray test was carried out with regard to the inner rotating shaft members of an invention specimen and two comparative specimens. The three specimens have the same geometrical shape of the invention, but the invention specimen was subjected to electroless Ni-phosphorus plating and one of the comparative specimens was subjected to hard Cr plating and another was not subjected to surface treatment. The results are shown in Table 1.

TABLE 1

| Product | Surface treatment of inner rotating shaft component | Rating number evaluation after 24 hrs |
|---|---|---|
| Invention specimen | Electroless plating of Nickel-phosphorus | 9 |
| Comparative specimen 1 | Hard Cr plating | 6 |
| Comparative specimen 2 | No surface treatment | 3 |

In the case of no surface treatment and hard chromium plating, it was confirmed that the results of the rating number evaluation were 3 and 6, respectively, with respect to rust which adversely affects the sliding motion of the bearing. In the case of the invention specimen with electroless nickel-phosphorus plating, the rating number evaluation was 9, which means that rust was not almost observed.

Another test of starting torque was carried out with respect of an invention bearing and a comparative bearing which has the same geometrical structure as that of the invention bearing except for that the convex surface of the inner rotating shaft member was subjected to hard Cr plating, the pressure-bearing seat was made of polyacetal, and that grease as lubricant was applied to the sliding contact surface. The results are shown in Table 2.

TABLE 2

| Product | Starting torque (kg-cm) |
|---|---|
| Invention bearing | 58 |
| Comparative bearing | 170 |

According to the present invention, there is provided with the spherical sliding bearing excellent in low starting torque, low friction, wear resistance, sliding properties without lubricating oil, and weather resistance.

What is claimed is:

1. A spherical sliding bearing comprising:

a hollow inner rotating metallic shaft member having a spherical convex surface on its periphery;

an outer load-carrying member having a spherical concave surface generally in conformity with said spherical convex surface, said hollow inner rotating shaft member being supported by said outer load-carrying member so as to rotate and oscillate under the fitting relationship between the convex and concave surfaces; and a pressure-bearing seat being interposed between the convex and concave surfaces, which comprises a fluorocarbon resin, a modifier dispersed in said fluorocarbon resin, and a reinforcement metallic member which is not exposed to the sliding-contact surface of the pressure-bearing seat;

wherein at least the convex surface of said hollow inner rotating shaft member is provided with a Ni-P electroless plating film having a thickness of from 8 to 15 μm and a hardness of from Hv 900 to 1100.

2. A spherical sliding bearing according to claim 1, wherein said fluorocarbon resin is at least one selected from tetrafluoroethylene resin (PTFE), tetrafluoroethylene-perfluoroalkyl-vinyl-ether copolymer resin, tetrafluoroethylene-hexafluoropropylene copolymer resin, and fluoroethylene-propylene-ether resin.

3. A spherical sliding bearing according to claim 1, wherein said modifier is at least one material selected from the group consisting of oxybenzoylpolyester, polyphenylene sulfide, a thermosetting resin, a metal lubricant, metal oxide, metal sulfide, metal fluoride, a carbonic solid lubricant, and ceramics.

4. A spherical sliding bearing according to claim 1, wherein said modifier is dispersed in the fluorocarbon resin in the form of grains.

5. A spherical sliding bearing according to claim 1, wherein said modifier is dispersed in the fluorocarbon resin as fibers.

6. A spherical sliding bearing according to claim 1, wherein said reinforcement metallic member comprises a net.

7. A spherical sliding bearing according to claim 6, wherein said net is completely embedded in the fluorocarbon resin containing the modifier so that the fluorocarbon resin covers not only its entire surface but also fills the meshes.

8. A spherical sliding bearing comprising:

a hollow inner rotating metallic shaft member having a spherical convex surface on its periphery;

an outer load-carrying member having a spherical concave surface generally in conformity with said spherical convex surface, said hollow inner rotating shaft member being supported by said outer load-carrying member so as to rotate and oscillate under the fitting relationship between the convex and concave surfaces; and a pressure-bearing seat being interposed between the convex and concave surfaces, which comprises a fluorocarbon resin, a modifier dispersed in said fluorocarbon resin, and a reinforcement metallic member which is not exposed to the sliding-contact surface of the pressure-bearing seat;

wherein said fluorocarbon resin is at least one selected from tetrafluoroethylene resin (PTFE), tetrafluoroethylene-perfluoroalkyl-vinyl-ether copolymer resin, tetrafluoroethylene-hexafluoropropylene copolymer resin, and fluoroethylene-propylene ether resin;

wherein said modifier is at least one material selected from the group consisting of oxybenzoyl-polyester, polyphenylene sulfide, a thermosetting resin, a metal lubricant, metal oxide, metal sulfide, metal fluoride, a carbonic solid lubricant, and ceramics;

wherein said modifier is dispersed in the fluorocarbon resin in the form of grains or fibers;

wherein said reinforcing metallic member comprises a net completely embedded in the fluorocarbon resin containing the modifier so that the fluorocarbon resin entirely covers said net and fills meshes of said net; and wherein at least the convex surface of said hollow inner rotating shaft member is provided with a Ni-P electroless plating film having a hardness of from Hv 900 to 1100.

9. A spherical sliding bearing according to claim 1, wherein the Ni-P electroless plating film has a thickness of from 8 to 15 μm.

10. A spherical sliding bearing according to claim 1, wherein said pressure-bearing seat is fixed along the concave surface of the outer load-carrying member.

11. A spherical sliding bearing according to claim 10, wherein said pressure-bearing seat is fixed with circumferential ring shape projections of the outer load-carrying member, which are located apart from each other in the axial direction of the outer load-carrying member and project at the two end edges of the concave surface.

12. A spherical sliding bearing according to claim 1, wherein said outer load-carrying member has a structure in which the spherical concave surface is divided into two sections in the axial direction, said two components being connected to each other such that the spherical concave surface is fitted on the convex surface of said hollow inner rotating shaft member via pressure-bearing seat.

13. A spherical sliding bearing according to claim 12, wherein said two sections are made of a metal and connected to each other by means of caulking with utilization of a projection formed on one of the two sections.

* * * * *